United States Patent Office 3,766,202
Patented Oct. 16, 1973

3,766,202
1,3-DISUBSTITUTED-5-(SUBSTITUTED THIO)
IMINO-2,4-IMIDAZOLIDINE-DIONES AND
THE 4-THIO ANALOGS
Malcolm Scott Singer, Richmond, Calif., assignor to
Chevron Research Company, San Francisco, Calif.
No Drawing. Continuation-in-part of abandoned application Ser. No. 56,899, July 20, 1970, which is a continuation-in-part of application Ser. No. 852,509, Aug. 22, 1969, now Patent No. 3,655,689, which in turn is a continuation-in-part of abandoned application Ser. No. 745,417, July 17, 1968. This application May 12, 1971, Ser. No. 142,756
Int. Cl. C07d 49/32
U.S. Cl. 260—309.5          10 Claims

ABSTRACT OF THE DISCLOSURE

Compounds of the formula

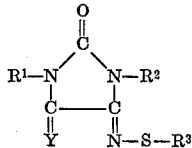

wherein Y is O or S, $R^1$ and $R^2$ are individually hydrocarbyl radicals of 1 to 12 carbon atoms optionally substituted with halogens, nitro groups, alkyl groups, or alkoxy groups, and $R^3$ is alkyl or alkenyl of 1 to 6 carbon atoms optionally substituted with halogen atoms, or aryl of 6 to 12 carbon atoms optionally substituted with halogen atoms, have herbicidal activity.

CROSS-REFERENCE TO RELATED APPLICATION

This application is a continuation-in-part of application Ser. No. 56,899, filed July 20, 1970, now abandoned, which is in turn a continuation-in-part of application Ser. No. 852,509, filed Aug. 22, 1969, now U.S. Pat. 3,655,689, which is in turn a continuation-in-part of application Ser. No. 745,417, filed July 17, 1968, now abandoned.

BACKGROUND OF THE INVENTION

Field

The present invention relates to novel imidazolidinediones, particularly 1,3-disubstituted-5-(substituted thio) imino-2,4-imidazolidinediones and the 4-thio analogs and their use as herbicides.

DESCRIPTION OF THE INVENTION

The novel compounds of this invention can be represented by the formula

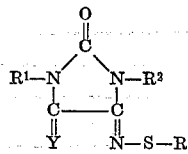

wherein Y is O or S; $R^1$ and $R^2$ are individually aliphatic hydrocarbyl of 1 to 10 carbon atoms substituted with 0 to 6 halogens of atomic number 9 to 35 (fluorine, chlorine or bromine), cycloaliphatic of 3 to 10 carbon atoms substituted with 0 to 6 halogens of atomic number 9 to 35, or aryl of 6 to 12 carbon atoms substituted with 0 to 5 halogens of atomic number 9 to 35, nitro groups, alkoxy groups individually of 1 to 4 carbon atoms or alkyl groups individually of 1 to 4 carbon atoms, or 0 to 1 trichloromethyl; and $R^3$ is alkyl of 1 to 6 carbon atoms substituted with 0 to 6 halogen atoms of atomic number 9 to 35, alkenyl of 2 to 6 carbon atoms substituted with 0 to 6 halogen atoms of atomic number 9 to 35, or aryl of 6 to 12 carbon atoms substituted with 0 to 5 halogen atoms of atomic number 9 to 35 or alkyl groups of 1 to 4 carbon atoms. Preferably, either $R^1$ or $R^2$ will be aliphatic or cycloaliphatic, optionally substituted as the case may be, and the other of $R^1$ or $R^2$ will be aryl, optionally substituted as the case may be.

Preferably, either $R^1$ or $R^2$ will be alkyl of 1 to 6 carbon atoms substituted with 0 to 6 halogen atoms of atomic number 9 to 35 or alkenyl of 2 to 6 carbon atoms substituted with 0 to 6 halogen atoms of atomic number 9 to 35 and the other of $R^1$ or $R^2$ will be aryl of 6 to 12 carbon atoms substituted with 0 to 3 halogen atoms of atomic number 9 to 35, nitro groups, alkoxy groups of 1 to 4 carbon atoms, or alkyl groups of 1 to 4 carbon atoms.

The particularly preferred compounds of the present invention are represented by the above formula wherein Y is O or S, either of $R^1$ or $R^2$ is alkyl of 1 to 4 carbon atoms, preferably methyl, and the other of $R^1$ or $R^2$ is phenyl substituted with 0 to 3 (preferably 0 to 1) halogen atoms of atomic number 9 to 35, preferably fluorine or alkyl groups of 1 to 4 carbon atoms; and $R^3$ is alkyl of 1 to 2 carbon atoms substituted with 0 to 4 halogen atoms of atomic number 9 to 35, preferably chlorine, vinyl substituted with 0 to 3 halogen atoms of atomic number 9 to 35, preferably chlorine, phenyl substituted with 0 to 3 (preferably 0 to 1) halogen atoms of atomic number 9 to 35 (preferably chlorine) or alkyl groups of 1 to 4 carbon atoms. Particularly desirable are the compounds wherein Y is O and $R^1$ is alkyl of 1 to 4 carbon atoms, preferably methyl, $R^2$ is phenyl substituted with 0 to 1 halogen atom of atomic number 9 to 35, preferably fluorine in the ortho position, and $R^3$ is methyl, ethyl, vinyl, trichloromethyl, tetrachloroethyl, trichlorovinyl, phenyl or chlorophenyl. A particularly preferred compound is 1-phenyl-3-methyl-S-trichloromethylthioimino-2,4-imidazolidinedione.

Representative groups which $R^1$ and $R^2$ may represent include alkyl such as methyl, ethyl, propyl, butyl, pentyl, hexyl, heptyl, octyl, nonyl, decyl; cycloalkyl such as cyclopropyl, cyclobutyl, cyclohexyl, cyclodecyl; alkenyl such as vinyl, allyl, crotyl, 3-butenyl, 3-pentenyl, 9-decenyl, 2,4-octenyl; alkynyl such as propargyl; halogen substituted groups such as chloromethyl, 2,2-dichloroethyl, perchloroallyl, 2,4-dichloropentyl, bromomethyl, fluoromethyl, dichloromethyl, trichloromethyl, 6,8-dichlorodecyl, 6-bromo-7-chlorooctyl; aryl and substituted aryl such as phenyl, p-chlorophenyl, m-bromophenyl, o-fluorophenyl, o-trifluoromethylphenyl, m-nitrophenyl, p-methoxyphenyl, o-ethoxyphenyl, m-butoxyphenyl, 2-chloro-4-methylphenyl, α-naphthyl, β-naphthyl, p-nitrophenyl, p-isopropylphenyl, 2,4-dichlorophenyl, 3-chloro-4-bromophenyl, pentachlorophenyl, 2,4,6-tribromophenyl, and 3,5-difluorophenyl, etc.

Representative groups which $R^3$ may represent include methyl, ethyl, propyl, butyl, pentyl, hexyl, allyl, crotyl, vinyl, 3-pentenyl, 4-hexenyl, perchloromethyl, dichloromethyl, bromoethyl, fluoromethyl, 1,1,2,2-tetrachloroethyl, 1,1,2-trichloroethyl, 2,4-dichloropropyl, 2,6-difluorohexyl, 1,2-dibromoethyl, trichlorovinyl, 2,2-dibromovinyl, perchloroethyl, 1,2,2-trichloroethyl, 2,2,2-trichloroethyl, 1,2-dibromoethyl, 1,2-dibromovinyl, perfluoromethyl, phenyl, 2-methylphenyl, 4-ethylphenyl, p-chlorophenyl, 2,4-dichlorophenyl, 2-fluorophenyl, 2-bromo-3-chlorophenyl, 3,5-dichlorophenyl, 2,4,6-trifluorophenyl, 4-bromophenyl, etc.

Included among the compounds covered by this invention are the following:

1-methyl-3-p-chlorophenyl-5-m-chlorophenylthioimino-2,4-imidazolidinedione,
1-allyl-3-o-fluorophenyl-4-thio-5-trichlorovinylthioimino-2,4-imidazolidinedione,
1-o-trifluorophenyl-3-methyl-5-p-chlorophenylthioimino-2,4-imidazolidinedione,
1-(2,4-dichlorophenyl)-3-crotyl-4-thio-5-(1,1,2,2,-tetrabromoethyl)thioimino-2,4-imidazolidinedione,
1-(2-fluorophenyl)-3-pentachloroethyl-5-trichlorovinylthioimino-2,4-imidazolidinedione,
1-trichloromethyl-3-(2-bromo-3-chlorophenyl)-4-thio-5-(2,4,6-trichlorophenyl)thioimino-2,4-imidazolidinedione,
1-butyl-3-p-chlorophenyl-5-(1,2,2-trichloro-2-bromoethyl)thioimino-2,4-imidazolidinedione,
1-p-fluorophenyl-3-trifluoromethyl-5-m-fluorophenylthioimino-2,4-imidazolidinedione,
1,3-dimethyl-5-(2-chloro-4-fluorophenylthio)imino-2,4-imidazolidinedione,
1,3-diphenyl-5-trichlorovinylthioimino-2,4-imidiazolidinedione,
1-butyl-3-pentyl-4-thio-5-(1,1,2-trichloroethylthio)imino-2,4-imidazolidinedione,
1-p-chlorophenyl-3-o-m-dibromophenyl-5-tribromomethylthioimino-2,4-imidazolidinedione, etc.

The compounds of this invention are made by the reaction of an appropriate 5-imino compound with a sulfenyl halide. Thus,

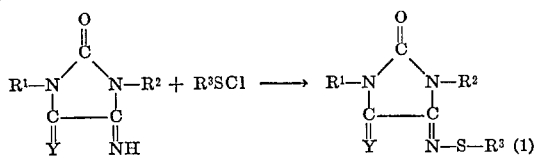

wherein $R^1$, $R^2$, $R^3$ and Y have the same meaning as before.

This reaction (1) is usually carried out in a polar aprotic solvent such as dimethyl formamide. The two reactants in approximately equal molar amounts, either one or both of which may be dissolved in the solvent, are mixed and allowed to react. The quantity of solvent is usually equal in weight to that of the reactants and can be up to ten times that quantity. The reaction is usually carried out at temperatures in the range of 10° C. to the reflux temperature of the solvent, preferably at 30 to 50° C. Reactions are usually complete within ¼ to 5 hours. Optionally a hydrogen halide acceptor is used to scavenge the hydrogen halide (e.g., HCl) by-product. The preferred acceptors are the organic amines, such as triethylamine, piperidine, pyridine, morpholine, etc. When an acceptor is used, it is present in a molar amount equal to that of the sulfenyl halide reactant. Preferably the amine is mixed with the imidazolidinedione prior to adding the sulfenyl chloride.

After reaction, the workup consists in removing the solvent by evaporation, washing the crude product with water to remove the amine salt if present, and then purifying the product by crystallization or by chromatography.

The sulfenyl chloride reactant of reaction (1) is commercially available or is readily prepared by the chlorination of the corresponding mercaptan.

The imidazolidinedione reactant of reaction (1) may be prepared by reacting a 1-cyanoformamide or 1-cyanothioformamide with an isocyanate in the presence of a base catalyst according to the following reaction:

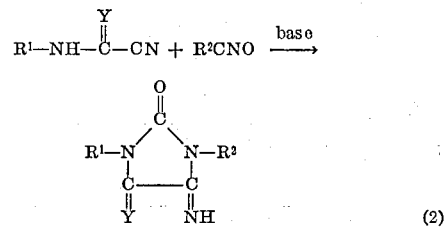

wherein $R^1$, $R^2$ and Y are as defined previously. Preferred base catalysts which may be used in reaction (2) are tertiary amines such as triethylamine and tributylamine. These catalysts will be used in catalytic amounts, usually about 0.001 to 0.1 mol per mol of reactant. This reaction is exothermic and the temperature will usually be controlled within the range 0 to 50° C. While in most instances the reactants are miscible, it is desirable to carry out the reaction in polar aprotic solvents such as dimethoxyethane, tetrahydrofuran, acetonitrile, dimethylformamide and dimethylsulfoxide.

The compounds of the present invention and their preparation are further illustrated by the following examples. These examples are intended to illustrate the invention described herein and are in no manner intended to limit it. Unless otherwise indicated, percentages are by weight.

EXAMPLE 1

Preparation of 1-phenyl-3-methyl-5-phenyl-thioimino-2,4-imidazolidinedione 1-phenyl-3-methyl-2,4-imidazolidinedione, 20.3 grams (0.1 mol) was dissolved in 100 ml. of dimethylformamide. Then 14.5 grams (0.1 mol) of phenylsulfenylchloride was added slowly with stirring. An exothermic reaction occurred. The mixture was stirred for ½ hour at room temperature. The reaction mixture was filtered and washed with petroleum ether and dried to give 20.0 grams of product, M.P. 184–186° C. Analysis, calculated for $C_{16}H_{13}N_3O_2S$: N, 13.5%; S, 10.3%. Found: N, 13.4%; S, 10.0%. An infrared spectra showed strong adsorption bands at: 685, 741, 1075, 1149, 1190, 1724 and 1770 cm.$^{-1}$.

By the general procedure described in the example above, other imidazolidinediones of this invention were prepared. These compounds and their analyses are reported in Table I.

TABLE I

| Compound | Chlorine | | Nitrogen | | Sulfur | | Melting point ° C. |
|---|---|---|---|---|---|---|---|
| | Calculated | Found | Calculated | Found | Calculated | Found | |
| 1-methyl-3-phenyl-4-thio-5-phenylthiomino-2,4-imidazolidinedione | | | 12.8 | 13.7 | 19.6 | 18.3 | 207–209 |
| 1-phenyl-3-methyl-5-p-chlorophenylthioimino-2,4-imidazolidinedione | 10.1 | 9.6 | | | 9.3 | 8.8 | 192–195 |
| 1-phenyl-3-methyl-5-(1,1,2,2-tetrachloroethylthioimino)-2,4-imidazolidinedione | 35.4 | 39.3 | | | 8.0 | 6.8 | 196–200 |
| 1,3-dimethyl-5-phenylthioimino-2,4-imidazolidinedione | | | 16.9 | 17.1 | 12.9 | 12.3 | 184–185 |
| 1,3-dimethyl-5-p-chlorophenylthioimino-2,4-imidazolidinedione | 12.4 | 13.1 | | | 11.3 | 11.8 | 194–197 |
| 1-phenyl-3-methyl-5-perchloromethylthioimino-2,4-imidazolidinedione | 31.5 | 29.5 | | | 9.1 | 8.9 | 159–163 |
| 1-methyl-3-phenyl-5-phenylthioimino-2,4-imidazolidinedione | | | 13.5 | 14.8 | 10.3 | 9.8 | 199–203 |
| 1,3-diphenyl-5-phenylthioimino-2,4-imidazolidinedione | | | 11.3 | 11.2 | 8.6 | 8.4 | 202–205 |

TABLE I

| Compound | Chlorine Calculated | Chlorine Found | Nitrogen Calculated | Nitrogen Found | Sulfur Calculated | Sulfur Found | Melting point ° C. |
|---|---|---|---|---|---|---|---|
| 1,3-dimethyl-5-perchloromethylthioimino-2,4-imidazolidinedione | 36.7 | 34.8 | | | 11.0 | 10.5 | 128-133 |
| 1,3-dimethyl-5-trichlorovinylthioimino-2,4-imidazolidinedione | 35.2 | 31.1 | | | 10.6 | 9.8 | 138-142 |
| 1,3-diphenyl-5-trichlorovinylthioimino-2,4-imidazolidinedione | 25.9 | 24.7 | | | 7.8 | 7.5 | 165-169 |
| 1-(2-fluorophenyl)-3-methyl-5-phenylthioimino-2,4-imidazolidinedione | [1] 5.8 | [1] 6.0 | | | 9.7 | 9.5 | 153-156 |
| 1-(2-fluorophenyl)-3-methyl-5-perchloromethylthioimino-2,4-imidazolidinedione | 28.7 | 26.6 | | | 8.6 | 10.0 | 135-137 |
| 1-phenyl-3-methyl-5-trichlorovinylthioimino-2,4-imidazolidinedione | 29.1 | 28.7 | | | 8.8 | 9.0 | 140-144 |
| 1-(2-fluorophenyl)-3-methyl-5-(4-chlorophenylthioimino)-2,4-imidazolidinedione | 9.6 | 9.6 | | | 8.8 | 8.7 | 178-180 |
| 1-(2-fluorophenyl)-3-methyl-5-ethylthioimino-2,4-imidazolidinedione | | | 14.4 | 14.3 | 11.4 | 10.1 | 112-117 |

[1] Fluorine analysis.

UTILITY

The imidazolidinediones of the present invention are, in general, herbicidal in both pre- and post-emergence applications. For pre-emergence control of undesirable vegetation these imidazolidinediones will be applied in herbicidal quantities to the environment, e.g., soil infested with seeds and/or seedlings of such vegetation. Such application will inhibit the growth of or kill the seeds, germinating seeds and seedlings. For post-emergence applications the imidazolidinediones of the present invention will be applied directly to the foliage and other plant parts. Generally they are effective against weed grasses as well as broadleaved weeds. Some may be selective with respect to type of application and/or type of weed.

Pre- and post-emergence herbicidal tests on representative imidazolidinediones of this invention were made using the following methods:

Post-emergence test

The test imidazolidinedione was formulated in the same manner as described above for the pre-emergence test. The concentration of the imidazolidinedione in this formulation was 5000 p.p.m. This formulation was uniformly sprayed on 2 replicate pots of 24-day-old plants (approximately 15 to 25 plants per pot) at a dose of 100 mg. per cm.$^2$. After the plants had dried, they were placed in a greenhouse and then watered intermittently at their bases as needed. The plants were observed periodically for phytotoxic effects and physiological and morphological responses to the treatment. After 3 weeks the herbicidal effectiveness of the imidazolidinedione was rated based on these observations. A 0 to 100 scale was used; 0 representing no phytotoxicity, 100 representing complete kill.

The results of these tests appear in Table II.

TABLE II

| Compound | Herbicidal effectiveness, pre/post of— | | | | | |
|---|---|---|---|---|---|---|
| | O | W | C | M | P | L |
| 1-phenyl-3-methyl-5-phenylthioimino-2,4-imidazolidinedione | | | | 100/75 | 100/65 | 100/75 |
| 1-methyl-3-phenyl-4-thio-5-phenylthioimino-2,4-imidazolidinedione | | | | 70/65 | —/60 | |
| 1-phenyl-3-methyl-5-p-chlorophenylthioimino-2,4-imidazolidinedione | | | | 100/100 | 100/90 | 100/85 |
| 1-phenyl-3-methyl-5-(1,1,2,2-tetrachloroethylthioimino)-2,4-imidazolidinedione | 100/— | 100/— | 100/— | 100/90 | 100/90 | 100/90 |
| 1,3-dimethyl-5-phenylthioimino-2,4-imidazolidinedione | | | | —/85 | —/60 | —/65 |
| 1,3-dimethyl-5-p-chlorophenylthioimino-2,4-imidazolidinedione | | | | —/95 | —/90 | /90 |
| 1-phenyl-3-methyl-5-perchloromethylthioimino-2,4-imidazolidinedione | 100/80 | 100/80 | 100/75 | 100/100 | 100/100 | 100/100 |
| 1-methyl-3-phenyl-5-phenylthioimino-2,4-imidazolidinedione | —/70 | | 60/— | 100/95 | 95/95 | 95/95 |
| 1-(2-fluorophenyl)-3-methyl-5-phenylthioimino-2,4-imidazolidinedione | 95/— | 100/— | 100/— | 100/90 | 100/90 | 100/85 |
| 1-(2-fluorophenyl)-3-methyl-5-perchloromethylthioimino-2,4-imidazolidinedione | 100/95 | 100/65 | 100/— | 100/100 | 100/100 | 100/100 |
| 1-phenyl-3-methyl-5-trichlorovinylthioimino-2,4-imidazolidinedione | 80/— | 70/— | 85/— | 90/90 | 95/65 | 100/80 |
| 1-(2-fluorophenyl)-3-methyl-5-(4-chlorophenylthioimino)-2,4-imidazolidinedione | 100/— | 100/— | 100/— | 100/90 | 100/80 | 100/80 |
| 1-(2-fluorophenyl)-3-methyl-5-ethylthioimino-2,4-imidazolidinedione | 90/100 | 90/95 | 90/95 | 90/100 | 90/100 | 90/100 |

NOTE:—O=Wild Oats (*Avena fatua*); W=Watergrass (*Echinochloa crusgalli*); C=Crabgrass (*Digitaria sanquinalis*); M=Mustard (*Brassica arvensis*); P=Pigweed (*Amaranthus retroflexus*); L=Lambsquarter (*Chenopodium album*).

Pre-emergence test

An acetone solution of the test imidazolidinediones was prepared by mixing 750 mg. imidazolidinedione, 220 mg. of a nonionic surfactant and 25 ml. of acetone. This solution was added to approximately 125 ml. of water containing 156 mg. of surfactant.

Seeds of the test vegetation were planted in a pot of soil and the imidazolidinedione solution was sprayed uniformly onto the soil surface at a dose of 100 mg. per cm.$^2$. The pot was watered and placed in a greenhouse. The pot was watered intermittently and was observed for seedling emergence, health of emerging seedlings, etc. for a 3-week period. At the end of this period the herbicidal effectiveness of the imidazolidinedione was rated based on the physiological observations. A 0 to 100 scale was used; 0 representing no phytotoxicity, 100 representing complete kill.

The amount of imidazolidinedione administered will vary with the particular plant part or plant growth medium which is to be contacted, the general location of application, i.e., sheltered areas such as greenhouses as compared to exposed areas such as fields, as well as the desired type of control. For preemergent control of most plants dosages in the range of about 0.5 to 20 lbs. per acre will be used. Such administration will give a concentration of about 2 to 80 p.p.m. imidazolidinedione distributed throughout 0.1 acre-foot. For post-emergence application, such as foliar spray application, compositions containing about 0.5 to 8 lbs. imidazolidinedione per 100 gal. spray will be used. Such application is equivalent to about 0.5 to 20 lbs. imidazolidinedione per acre.

The herbicidal compositions of this invention comprise a herbicidal amount of one or more of the above described imidazolidinediones intimately admixed with a biologically inert carrier. The carrier may be a liquid diluent such as water or acetone or a solid. The solid may be in the form of dust powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, fillers and the like.

As will be evident to those skilled in the art, various modifications on this invention can be made or followed, in the light of the foregoing disclosure and discussion, without departing from the spirit or scope of the disclosure or from the scope of the following claims.

What is claimed is:

1. Compound of the formula

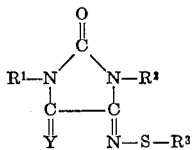

wherein Y is O or S; $R^1$ and $R^2$ are individually alkyl of 1 to 10 carbon atoms substituted with 0 to 6 halogens of atomic number 9 to 35, alkenyl of 2 to 10 carbon atoms substituted with 0 to 6 halogens of atomic number 9 to 35, propargyl or cycloalkyl of 3 to 10 carbon atoms substituted with 0 to 6 halogens of atomic number 9 to 35, or phenyl substituted with 0 to 5 halogens of atomic number 9 to 35, 0 to 5 nitro groups, 0 to 5 alkoxy groups individually of 1 to 4 carbon atoms or 0 to 5 alkyl groups individually of 1 to 4 carbon atoms, or 0 to 1 trichloromethyl; and $R^3$ is alkyl of 1 to 6 carbon atoms substituted with 0 to 6 halogen atoms of atomic number 9 to 35, alkenyl of 2 to 6 carbon atoms substituted with 0 to 6 halogen atoms of atomic number 9 to 35, or phenyl substituted with 0 to 5 halogen atoms of atomic number 9 to 35 or alkyl groups of 1 to 4 carbon atoms.

2. Compound of claim 1 wherein either $R^1$ or $R^2$ is alkyl of 1 to 6 carbon atoms substituted with 0 to 6 halogen atoms of atomic number 9 to 35 or alkenyl of 2 to 6 carbon atoms substituted with 0 to 6 halogen atoms of atomic number 9 to 35 and the other of $R^1$ or $R^2$ is phenyl substituted with 0 to 3 halogen atoms of atomic number 9 to 35, nitro groups, alkoxy groups of 1 to 4 carbon atoms, or alkyl groups of 1 to 4 carbon atoms.

3. Compound of claim 1 wherein either $R^1$ or $R^2$ is alkyl of 1 to 4 carbon atoms and the other of $R^1$ or $R^2$ is phenyl substituted with 0 to 3 halogen atoms of atomic number 9 to 35 or alkyl groups of 1 to 4 carbon atoms, and $R^3$ is alkyl of 1 to 2 carbon atoms substituted with 0 to 4 halogen atoms of atomic number 9 to 35, vinyl substituted with 0 to 3 halogen atoms of atomic number 9 to 35, or phenyl substituted with 0 to 3 halogen atoms of atomic number 9 to 35 or alkyl groups of 1 to 4 carbon atoms.

4. Compound of claim 1 wherein Y is O, $R^1$ is alkyl of 1 to 4 carbon atoms, $R^2$ is phenyl substituted with 0 to 1 halogen atom of atomic number 9 to 35, and $R^3$ is methyl, ethyl, vinyl, trichloromethyl, tetrachloroethyl, trichlorovinyl, phenyl, or chlorophenyl.

5. Compound of claim 4 wherein $R^1$ is methyl and $R^2$ is phenyl substituted with fluorine in the ortho position.

6. 1 - phenyl-3-methyl-5-trichloromethylthioimino-2,4-imidazolidinedione.

7. The compound of claim 1 being 1-phenyl-3-methyl-5 - (1,1,2,2 - tetrachloroethylthioimino)-2,4-imidazolidinedione.

8. The compound of claim 1 being 1-(2-fluorophenyl)-3-methyl-5-phenylthioimino-2,4-imidazolidinedione.

9. The compound of claim 1 being 1-(2-fluorophenyl)-3 - methyl-5-perchloromethylthioimino-2,4-imidazolidinedione.

10. The compound of claim 1 being 1-(2-fluorophenyl)-3 - methyl-5-(4-chlorophenylthioimino)-2,4-imidazolidinedione.

References Cited
UNITED STATES PATENTS
3,340,070  9/1967  Windgassen _____ 260—309.5

HARRY I. MOATZ, Primary Examiner

U.S. Cl. X.R.

71—92